US007966501B2

(12) United States Patent
Kitamrua

(10) Patent No.: US 7,966,501 B2
(45) Date of Patent: Jun. 21, 2011

(54) MULTI-FUNCTION PERIPHERAL, POWER SUPPLY APPARATUS, AND POWER SUPPLY CONTROL METHOD

(75) Inventor: Tetsuo Kitamrua, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 929 days.

(21) Appl. No.: 11/867,316

(22) Filed: Oct. 4, 2007

(65) Prior Publication Data

US 2009/0094469 A1 Apr. 9, 2009

(51) Int. Cl.
*G06F 1/26* (2006.01)
(52) U.S. Cl. .................................. 713/300; 713/320
(58) Field of Classification Search .................. 713/300, 713/320; 399/88
See application file for complete search history.

(56) References Cited

U.S. PATENT DOCUMENTS

| 5,455,660 | A | * | 10/1995 | Kunzmann et al. | ............. 399/91 |
| 5,689,412 | A | * | 11/1997 | Chen | ............. 363/125 |
| 5,747,887 | A | * | 5/1998 | Takanaga et al. | ............. 307/64 |
| 6,580,460 | B1 | * | 6/2003 | Takahashi et al. | ............. 348/372 |
| 6,920,575 | B2 | * | 7/2005 | Odaohhara | ............. 713/340 |
| 7,024,574 | B2 | * | 4/2006 | Odaohhara et al. | ............. 713/324 |
| 2002/0191041 | A1 | * | 12/2002 | Asauchi | ............. 347/19 |
| 2005/0211692 | A1 | * | 9/2005 | Maitani | ............. 219/216 |
| 2007/0088963 | A1 | * | 4/2007 | Nakaya | ............. 713/300 |
| 2007/0132797 | A1 | * | 6/2007 | Jeon | ............. 347/14 |
| 2008/0260415 | A1 | * | 10/2008 | Sone et al. | ............. 399/88 |

FOREIGN PATENT DOCUMENTS

JP 2001-103678 4/2001
JP 2003-29579 * 1/2003

* cited by examiner

*Primary Examiner* — Chun Cao
(74) *Attorney, Agent, or Firm* — Turocy & Watson, LLP

(57) ABSTRACT

A digital multi-function peripheral includes a multi-function peripheral unit that has plural functions, a switching power supply unit connected to a commercial power supply as a main power supply for the multi-function peripheral unit, and an electrical storage device charged in advance as an auxiliary power supply for the multi-function peripheral unit. The digital multi-function peripheral further includes a control circuit that monitors a load current flowing to the multi-function peripheral unit, supplies electric power from the electrical storage device to the multi-function peripheral unit instead of electric power from the switching power supply unit when the load current is smaller than a threshold set as an allowable lower limit of power efficiency of the switching power supply unit, and supplies the electric power from the switching power supply unit to the multi-function peripheral unit when the load current increases to be equal to or larger than the threshold.

18 Claims, 9 Drawing Sheets

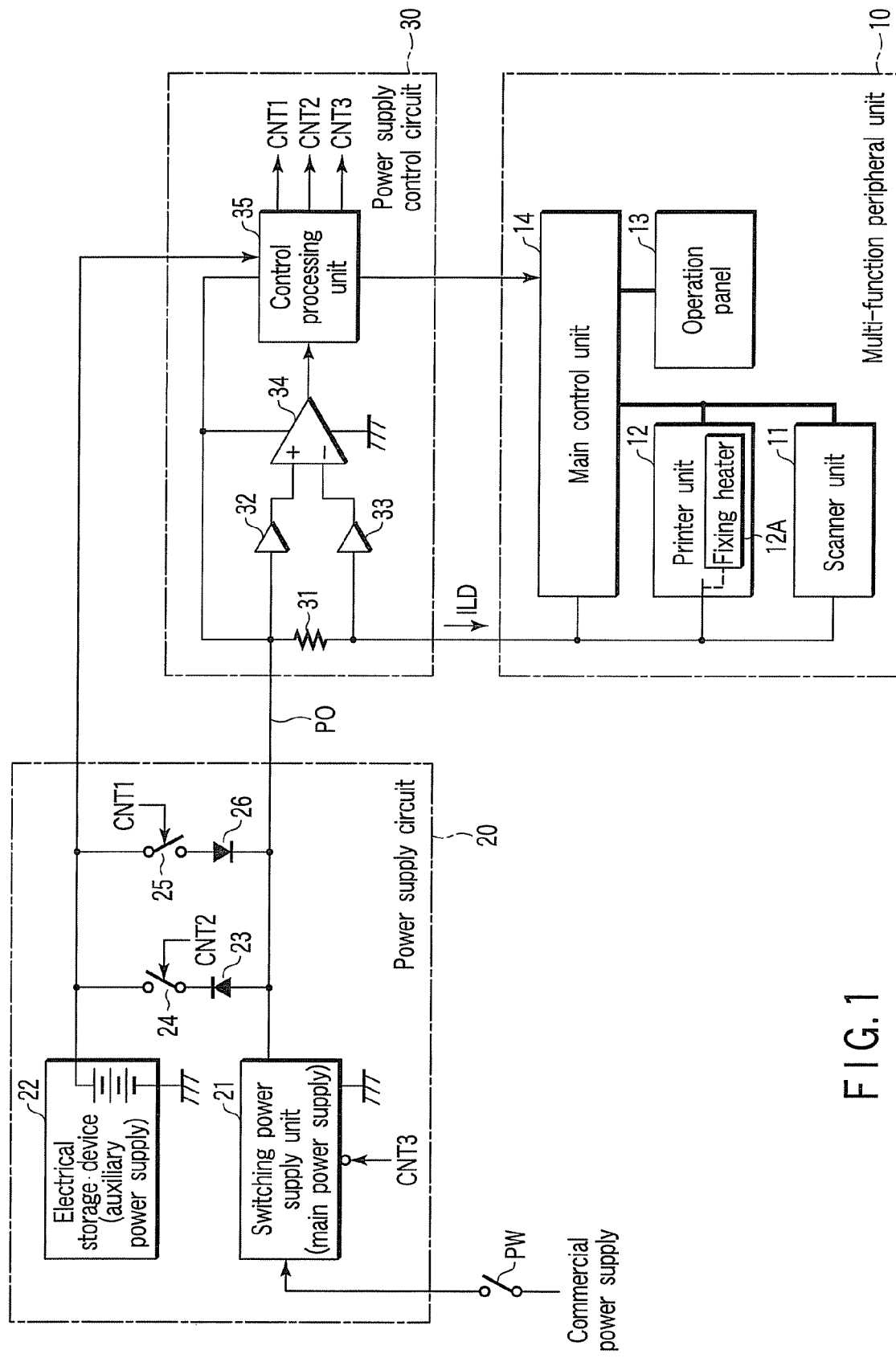
F I G. 1

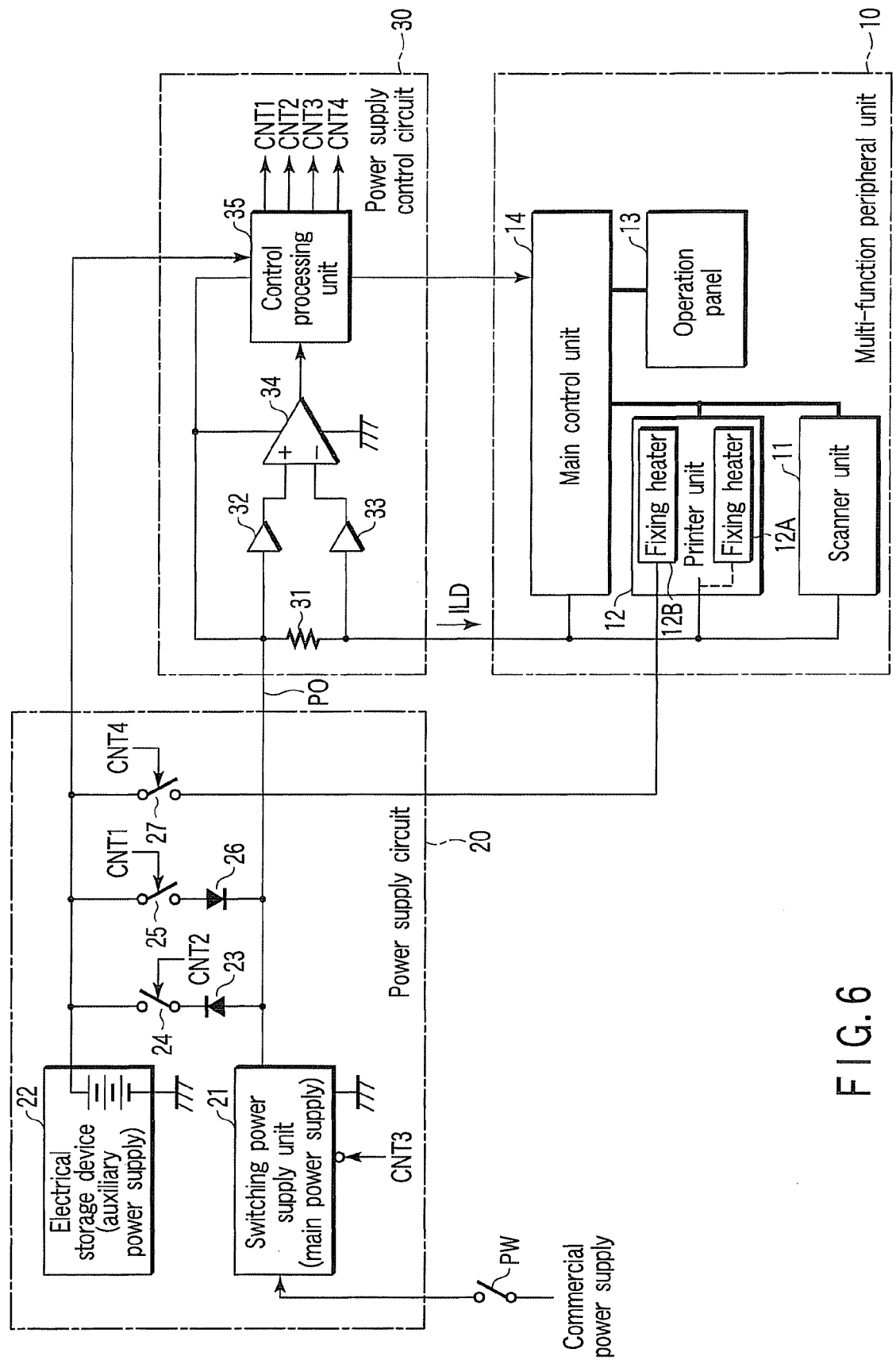
F I G. 6

MULTI-FUNCTION PERIPHERAL, POWER SUPPLY APPARATUS, AND POWER SUPPLY CONTROL METHOD

BACKGROUND OF THE INVENTION

1. Field of the Invention

The present invention relates to a multi-function peripheral, a power supply apparatus, and a power supply control method in which an electrical storage device is used as an auxiliary power supply.

2. Description of the Related Art

Recently, energy saving and improvement of convenience of a digital multi-function peripheral (MFP) have been advanced in accordance with requests from the market.

In general, the digital multi-function peripheral has a scanner function, a printer function, a copy function obtained by combining the scanner function and the printer function, and the like. The digital multi-function peripheral is adapted to reduce power consumption in a sleep state in which operations of these functions are not substantially performed. Specifically, a fixing heater for a fixing device that mainly consumes large electric power is turned off in the sleep state. Operations of components on a secondary side, which are loads on a power supply circuit, for example, various boards and sensors are also limited in the same manner as this fixing heater.

An electrical storage device such as a secondary battery or an electric double layer capacitor (EDLC) may be mounted as an auxiliary power supply that increases an electric current flowing to the fixing heater in warming up the fixing device. This reduces a warm-up time required for raising the temperature of the fixing device to a predetermined fixing temperature and improves convenience.

Incidentally, the power supply circuit of the digital multi-function peripheral is usually constituted by a switching power supply. However, it is difficult to obtain satisfactory power efficiency when operations of the components on the secondary side are limited to reduce an amount of an electric current flowing from the power supply circuit to the loads. For example, it is conceivable that a power supply unit having an expanded range of a load current with which high power efficiency is maintained or a power supply unit of a two-power supply system having an output for a standard current and an output for a small current is used as a power supply circuit. However, this scheme is not practical because an innegligible increase in manufacturing cost is caused. In this connection, JP-A-2001-103678 discloses a technique for effectively using commercial power that is comparatively inexpensive in the midnight hours. In this technique, switch control for charging the secondary battery in the midnight hours when the load current decreases and outputting electric power from the secondary battery via a switching power supply (DC/AC inverter) in hours except the midnight hours when the load current increases. However, in this technique, the switch control is performed irrespective of power efficiency of the switching power supply.

BRIEF SUMMARY OF THE INVENTION

It is an object of the present invention to provide a multi-function peripheral, a power supply apparatus, and a power supply control method that can reduce wasteful power consumption due to the fall in power efficiency.

According to a first aspect of the present invention, there is provided a multi-function peripheral including a multi-function peripheral unit that has plural functions, a power supply unit connected to a commercial power supply as a main power supply for the multi-function peripheral unit, an electrical storage device charged in advance as an auxiliary power supply for the multi-function peripheral unit, and a control circuit that monitors a load current flowing to the multi-function peripheral unit, supplies electric power from the electrical storage device to the multi-function peripheral unit instead of electric power from the power supply unit when the load current is smaller than a threshold set as an allowable lower limit of power efficiency of the power supply unit, and supplies the electric power from the power supply unit to the multi-function peripheral unit when the load current increases to be equal to or larger than the threshold.

According to a second aspect of the present invention, there is provided a power supply apparatus including a power supply unit connected to a commercial power supply as a main power supply for a multi-function peripheral unit that has plural functions, an electrical storage device charged in advance as an auxiliary power supply for the multi-function peripheral unit, and a control circuit that monitors a load current flowing to the multi-function peripheral unit, supplies electric power from the electrical storage device to the multi-function peripheral unit instead of electric power from the power supply unit when the load current is smaller than a threshold set as an allowable lower limit of power efficiency of the power supply unit, and supplies the electric power from the power supply unit to the multi-function peripheral unit when the load current increases to be equal to or larger than the threshold.

According to a third aspect of the present invention, there is provided a power supply control method for a power supply apparatus including a power supply unit connected to a commercial power supply as a main power supply for a multi-function peripheral unit that has plural functions and an electrical storage device charged in advance as an auxiliary power supply for the multi-function peripheral unit, the power supply control method including monitoring a load current flowing to the multi-function peripheral unit, supplying electric power from the electrical storage device to the multi-function peripheral unit instead of electric power from the power supply unit when the load current is smaller than a threshold set as an allowable lower limit of power efficiency of the power supply unit, and supplying the electric power from the power supply unit to the multi-function peripheral unit when the load current increases to be equal to or larger than the threshold.

In the multi-function peripheral, the power supply apparatus, and the power supply control method, the load current flowing to the multi-function peripheral unit is monitored. The electric power from the electrical storage device is supplied to the multi-function peripheral unit instead of the electric power from the power supply unit when the load current is equal to or smaller than the threshold set as the allowable lower limit of the power efficiency of the power supply unit. The electric power from the power supply unit is supplied to the multi-function peripheral unit when the load current increases to be equal to or larger than the threshold. In other words, since the power supply unit is used in a state in which the power efficiency is in an allowable range, wasteful power consumption due to the fall in the power efficiency can be prevented.

Since the electrical storage device is used for the supply of electric power in a state in which the load current is reduced, it is possible to continue the supply of electric power over a long time even if an electrical storage capacity is relatively small. This is advantageous in reducing a size of the multi-function peripheral. On the other hand, when the load current increases exceeding the threshold, the use of the electrical storage device is stopped. Consequently, since an excessively large electric current does not flow out from the electrical storage device, it is possible to extend the durable life of the electrical storage device.

Moreover, since a state of the multi-function peripheral unit is grasped through the monitoring of the load current, it is possible to secure universality with respect to a change in a type of the multi-function peripheral unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram schematically showing a circuit configuration of a digital multi-function peripheral according to a first embodiment of the present invention;

FIG. 6 is a diagram schematically showing a circuit configuration of a digital multi-function peripheral according to a second embodiment of the present invention;

DETAILED DESCRIPTION OF THE INVENTION

Figure 2:
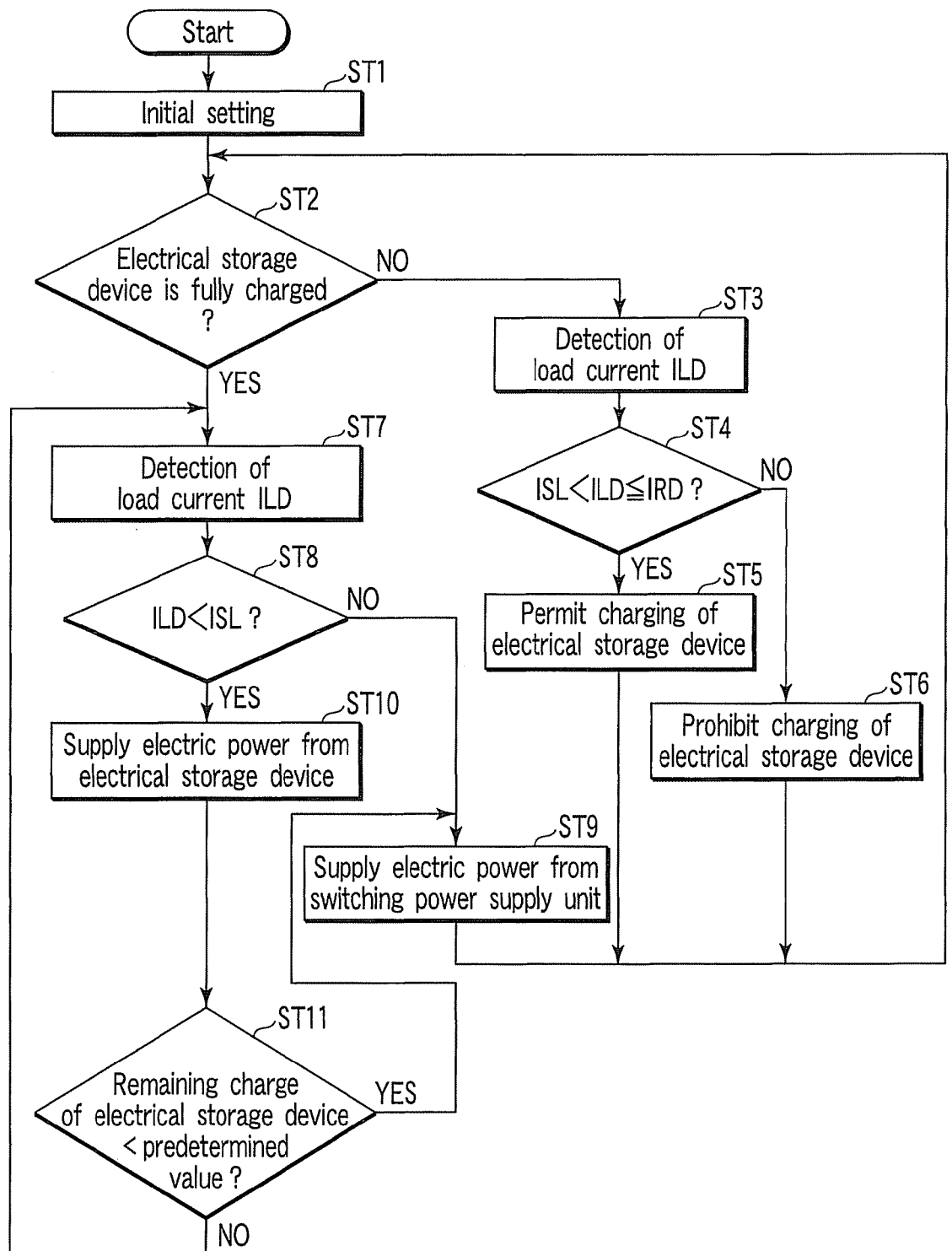
FIG. 2 is a flowchart showing a control operation of a power supply control circuit shown in FIG. 1.

A digital multi-function peripheral according to a first embodiment of the present invention will be hereinafter explained with reference to the accompanying drawings.

FIG. 1 schematically shows a circuit configuration of this digital multi-function peripheral. This digital multi-function peripheral includes a multi-function peripheral unit 10 that has a scanner function, a printer function, a copy function obtained by combining the scanner function and the printer function, and the like, a power supply circuit 20 that supplies electric power to this multi-function peripheral unit 10, and a power control circuit 30 that controls the power supply circuit 20 with control signals CNT1 to CNT3.

The multi-function peripheral unit 10 includes a scanner unit 11 that scans, for example, an image of an original, a printer unit 12 that prints the image on a sheet, an operation panel 13 for performing various kinds of key input and display, and a main control unit 14 that controls the scanner unit 11, the printer unit 12, and the operation panel 13. The scanner unit 11 is provided to scan, for example, for copying or computer editing, an image of an original. The printer unit 12 is a laser printer that prints, in an electrophotographic system, for example, an image scanned by the scanner unit 11 or, for example, an image corresponding to print data from an external computer connected via a network. In this printer unit 12, a print operation is performed by charging an image bearing member in advance, forming an electrostatic latent image on the image bearing member with a laser beam irradiated in association with an image that should be printed, developing this electrostatic latent image as a toner image, transferring this toner image onto a sheet, and thermally fixing the toner image on the sheet with a fixing device. This fixing device is heated by a fixing heater 12A that occupies most of power consumption of the multi-function peripheral unit 10. The operation panel 13 includes, as user interfaces, for example, hard keys such as menu selection keys, function option item selection keys, and numerical value input keys and a display of a touch panel system that displays pictures, messages, and the like and on which key input is possible. The main control unit 14 is connected to the scanner unit 11 and the printer unit 12 via a system bus SB and further connected to the operation panel 13. This main control unit 14 includes a CPU that performs data processing necessary for executing at least the scanner function, the printer function, and the copy function, a ROM that stores a control program and fixed data of this CPU, a RAM that temporarily stores data inputted to and outputted from the CPU, and a communication unit.

The power supply circuit 20 has a switching power supply unit 21 provided as a main power supply for the multi-function peripheral unit 10 and an electrical storage device 22 provided as an auxiliary power supply for the multi-function peripheral unit 10. The electrical storage device 22 is constituted by, for example, a secondary battery or an electric double layer capacitor (EDLC). The switching power supply unit 21 is connected to a commercial power supply via a power switch PW. The switching power supply unit 21 converts AC power from this commercial power supply into DC power in an inverter system and outputs the DC power to an output node PO of the power supply circuit 20. The output node PO is connected to the electrical storage device 22 via a diode 23 and a switch 24 provided for charging of the electrical storage device 22. The electrical storage device 22 is connected to the output node PO via a switch 25 and a diode 26 provided for DC current output from the electrical storage device 22. The switch 25 is controlled by the control signal CNT1 and the switch 24 is controlled by the control signal CNT2. The switch 25 is turned off when the control signal CNT1 is at a low level and is turned on when the control signal CNT1 is at a high level. The switch 24 is turned off when the control signal CNT2 is at the low level and is turned on when the control signal CNT2 is at the high level. The diode 23 is in a connection state in a direction for blocking an electric current flowing from the electrical storage device 22 to the output node PO. The diode 26 is in a connection state in a direction for blocking an electric current flowing from the output node PO to the electrical storage device 22. The switching power supply unit 21 is controlled by the control signal CNT3. The switching power supply unit 21 operates when the control signal CNT3 is at the low level and stops when the control signal CNT3 is at the high level.

The power supply control circuit 30 includes a resistor 31, buffer circuits 32 and 33, a differential amplifier 34, and a control processing unit 35. All of the buffer circuits 32 and 33, the differential amplifier 34, and the control processing unit 35 operate with electric power from the output node PO of the power supply circuit 20. The resistor 31 is connected in series between power supply lines of the output node PO and the multi-function peripheral unit 10. One end and the other end of the resistor 31 are connected to a noninverting input terminal and an inverting input terminal of the differential amplifier 34 via the buffer circuits 32 and 33, respectively. The differential amplifier 34 detects a difference between a potential at one end of the resistor 31 and a potential at the other end of the resistor 31, i.e., a voltage drop dependent on a load current ILD flowing to the multi-function peripheral unit 10 and a resistance of the resistor 31 and outputs a detection signal to the control processing unit 35. The control processing unit 35 is constituted by a memory, a programmable microprocessor chip including input and output ports, and the like. The control processing unit 35 has, as a part of a control program, a function of calculating the load current ILD from the voltage drop in the resistor 31 detected by the differential amplifier 34 and the resistance of the resistor 31, a function of confirming that the electrical storage device 22 is in a full charge state from an output terminal voltage inputted from the electrical storage device 22, and a function of calculating remaining charge by subtracting an integral value, which is obtained by time-integrating the load current ILD detected with a point when the electrical storage device 22 comes into the full charge state as an integration start reference, from the electrical storage capacity of the electrical storage device 22. Moreover, the control signals CNT1 to CNT3 are obtained from the control processing unit 35 as an execution result of the control program and supplied to the switch 25, the switch 24, and the switching power supply unit 21 to be controlled, respectively. Such a control state of the control processing unit 35 is notified to the main control unit of the multi-function peripheral unit 10.

When the power switch PW is turned on, electric power from the power supply circuit 20 is supplied to the multi-function peripheral unit 10. A state of the multi-function peripheral unit 10 transitions as described below after this turn-on of the power supply. First, the multi-function peripheral unit 10 comes into a warm-up state in which the multi-function peripheral unit 10 causes the scanner unit 11 and the printer unit 12 to perform preparation for operations. The fixing heater 12A is turned on in this warm-up state. When the temperature of the fixing device reaches a predetermined fixing temperature, the multi-function peripheral unit 10 comes into a ready state in which a print operation is possible. For example, when a copy start request is inputted by the operation of the operation panel 13, the multi-function peripheral unit 10 comes into a copy state in which the multi-function peripheral unit 10 scans an original image and prints this original image. The multi-function peripheral unit 10 comes into the ready state again when the copy operation ends. The fixing heater 12A consumes rated power in the warm-up state and the copy state. In the ready state, since the fixing heater 12A is intermittently energized, average power consumption falls compared with that in the warm-up state and the copy state. After the copy operation, when the ready state continues over a first predetermined time, the multi-function peripheral unit 10 comes into a pre-heating state in which the multi-function peripheral unit 10 drives the fixing heater 12A with electric power smaller than the power consumption in the ready state. When this pre-heating state further continues over a second predetermined time, this pre-heating state changes to a sleep state in which the multi-function peripheral unit 10 turns off the fixing heater 12 and limits power consumption of the other components.

The ready state, the pre-heating state, and the sleep state are released by inputting, for example, a copy start request from the operation panel 13. When the copy start request is inputted in the ready state, a copy operation is quickly started. On the other hand, when the copy start request is inputted in the pre-heating state or the sleep state, the copy operation is started through the warm-up state for obtaining the predetermined fixing temperature.

FIG. 2 shows a control operation of the power supply control circuit 30. This control operation is realized by programming the control processing unit 35 to be adapted to the state transition of the multi-function peripheral unit 10 described above. Immediately after the power switch PW is turned on, all the control signals CNT1 to CNT3 are at the low level. Therefore, the electrical storage device 22 is electrically separated from the output node PO by the switches 25 and 24 and the switching power supply unit 21 outputs electric power to the output node PO. When the control processing unit 35 starts the control operation shown in FIG. 2 with electric power from the switching power supply unit 21, initial setting is performed in step ST1. In this initial setting, the control processing unit 35 sets the control signals CNT1 to CNT3 to the low level anew to prevent states of the switching power supply unit 21, the switch 25, and the switch 24 from becoming unstable. A result of setting the control signals CNT1 to CNT3 is stored in the memory in the control processing unit 35. The control signals CNT1 to CNT3 are continuously outputted unless the low level is changed to an opposite level by the execution of the following steps. In step ST2, it is checked whether the electrical storage device 22 is fully charged. When the electrical storage device 22 does not come into the full charge state or a state close to the full charge state, the load current ILD is detected in step ST3. It is checked in step ST4 whether this load current ILD is larger than a threshold ISL set as an allowable lower limit of power efficiency of the switching power supply unit 21 and equal to or smaller than a reference value IRD in the ready state. IRD is a reference value of the load current ILD flowing to the multi-function peripheral unit 10 in the ready state and the like. When a reference value of a load current flowing to the multi-function peripheral unit 10 in the copy state is set as a maximum value, the reference value IRD is a value smaller than the reference value.

When the load current ILD satisfies a condition ISL<ILD≦IRD, the charging of the charging device 22 is permitted in step ST5. In other words, the control signal CNT2 is set to the high level and the switch 24 is turned on. At this point, the electrical storage device 22 is charged by a DC current flowing as a charging current from the switching power supply unit 21. On the other hand, when the load current ILD does not satisfy the condition ISL<ILD≦IRD, the charging of the charging device 22 is prohibited in step ST6. In other words, the control signal CNT2 is set to the low level, whereby the switch 24 is turned off. At this point, since the electrical storage device 22 is electrically separated from the switching power supply unit 21, the electrical storage device 22 is not charged. After the execution of step ST5 or ST6, step ST2 is executed again. Steps ST2, ST3, ST4, ST5, and ST6 are repeatedly executed until the electrical storage device 22 comes into the full charge state or a state close to the full charge state. The condition in step ST4 is satisfied in the states excluding the sleep state in which the power efficiency of the switching power supply unit 21 considerably falls, the warm-up state in which the rated power of the fixing heater 12A is consumed, and the copy state. Specifically, the condition in step ST4 is satisfied in the ready state and the pre-heating state. Therefore, the charging of the electrical storage device 22 is performed when the multi-function peripheral unit 10 is in the ready state and the pre-heating state. This charging is suspended when the multi-function peripheral unit 10 transitions to the other states and performed when the multi-function peripheral unit 10 returns to the ready state and the pre-heating state again. In this relation, while the electrical storage device 22 is charged, the control signals CNT1 and CNT3 are maintained at the low level.

When the charging of the electrical storage device 22 is completed, this is confirmed in step ST2 and the load current ILD is detected in step ST7. Subsequently, it is checked in step ST8 whether this load current ILD is smaller than the threshold ISL set as the allowable lower limit of the power efficiency of the switching power supply unit 21. When the load current ILD does not satisfy the condition ILD<ISL, setting for supplying the electric power from the switching power supply unit 21 to the multi-function peripheral unit 10 is performed in step ST9. At this point, the control signal CNT3 is set to the low level and the control signal CNT1 is set to the low level slightly after a point of the setting of the control signal CNT3 to prevent the supply of electric power to the multi-function peripheral unit 10 from being interrupted. In other words, unless the multi-function peripheral unit 10 is in the sleep state, the load current ILD does not satisfy the condition ILD<ISL and the power efficiency of the switching power supply unit 21 is in an allowable range. In this case, the multi-function peripheral unit 10 operates with the electric power from the switching power supply unit 21 and electric power from the electrical storage device 22 is not used. After the execution of step ST8, step ST2 is executed again. Steps ST2, ST7, ST8, and ST9 are repeatedly executed until the multi-function peripheral unit 10 comes into the sleep state.

When it is confirmed in step ST8 that the load current ILD satisfies the condition ILD<ISL, setting for supplying the electric power from the electrical storage device 22 to the multi-function peripheral unit 10 is performed in step ST10. At this point, the control signal CNT1 is set to the high level and the control signal CNT3 is set to the high level slightly after a point of the setting of the control signal CNT1 to prevent the supply of electric power to the multi-function peripheral unit 10 from being interrupted. In other words, when the multi-function peripheral unit 10 comes into the sleep state, the power efficiency of the switching power supply unit 21 falls exceeding the allowable range and the load current ILD satisfies the condition ILD<ISL. In this case, the multi-function peripheral unit 10 operates with the electric power from the electrical storage device 22 and the electric power from the switching power supply unit 21 is not used. Since the switching power supply unit 21 is in a stopped state, substantially power consumption does not occur in this switching power supply unit 21. After the execution of step ST10, it is checked in step ST11 whether remaining charge of the electrical storage device 22 decreases to be smaller than a predetermined value set to, for example, 10%. When the remaining charge is not smaller than this predetermined value, step ST7 is executed again. When the sleep state is not released, steps ST7, ST8, ST10, and ST11 are repeated until the remaining charge decreases to be smaller than the predetermined value. The electric power from the electrical storage device 22 is continuously supplied to the multi-function peripheral unit 10. Even if the multi-function peripheral unit 10 is in the sleep state, when it is confirmed in step ST11 that the remaining charge decreases to be smaller than the predetermined value, setting for supplying the electric power from the switching power supply unit 21 to the multi-function peripheral unit 10 is performed in step ST9. Consequently, the electric power from the switching power supply unit 21 is supplied to the multi-function peripheral unit 10 instead of the electric power from the electrical storage device 22.

Figure 3:
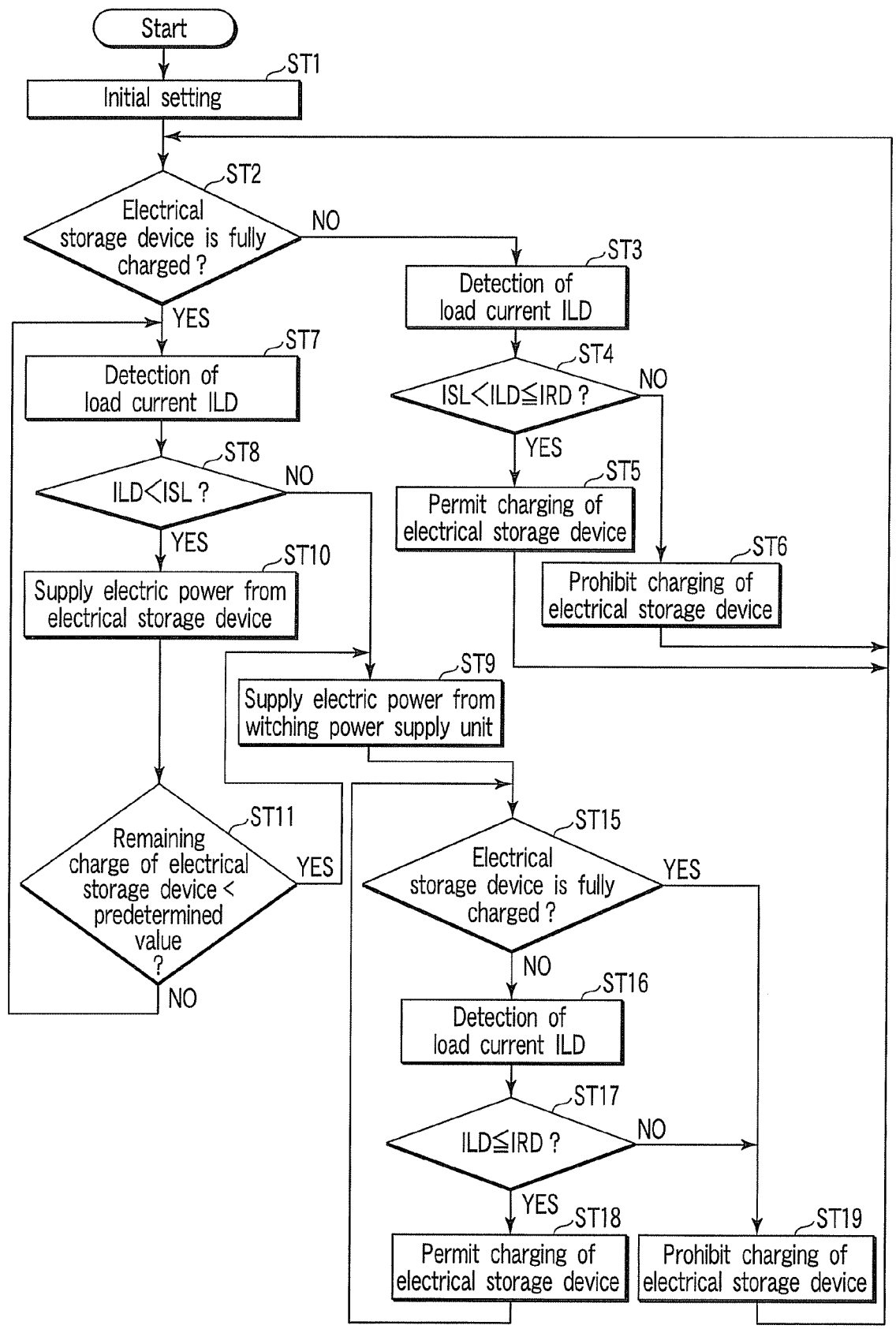
FIG. 3 is a flowchart showing a control operation performed in a modification of the power supply control circuit shown in FIG. 1.

In this case, the power efficiency of the switching power supply unit 21 may be in a less satisfactory state because power consumption of the multi-function peripheral unit 10 is small. To cope with this state, for example, steps ST15 to ST19 are added as shown in FIG. 3 and the electrical storage device 22 is charged simultaneously with the supply of electric power to the multi-function peripheral unit 10. In FIG. 3, in step ST15 following step ST9, it is checked whether the electrical storage device 22 is fully charged. When the electrical storage device 22 is not in the full charge state or a state close to the full charge state, the load current ILD is detected in step ST16. It is checked in step ST17 whether this load current ILD is equal to or smaller than the reference value IRD in the ready state and the like. When the load current ILD satisfies a condition ILD≦IRD, the charging of the charging device 22 is permitted in step ST5. In other words, the control signal CNT2 is set to the high level and the switch 24 is turned on. At this point, the electrical storage device 22 is charged by a DC current flowing as a charging current from the switching power supply unit 21. After the execution of step ST18, step ST15 is executed again. Steps ST9, ST15, ST16, ST17, and ST18 are repeatedly executed until the electrical storage device 22 comes into the full charge state of a state close to the full charge state. When the charging of the electrical storage device 22 is performed excluding the determination condition ISL<ILD in this way, the load current ILD of the switching power supply unit 21 increases and the power efficiency is improved. In other words, it is possible to prevent continuation of a state in which the power efficiency is low.

On the other hand, when the electrical storage device 22 comes into the full charge state or a state close to the full charge state in step ST15 or the load current ILD does not satisfy the condition ILD≦IRD in ST17, the charging of the charging device 22 is prohibited in step ST19. In other words, the control signal CNT2 is set to the low level, whereby the switch 24 is turned off. At this point, since the electrical storage device 22 is electrically separated from the switching power supply unit 21, the electrical storage device 22 is not charged.

Figure 4:
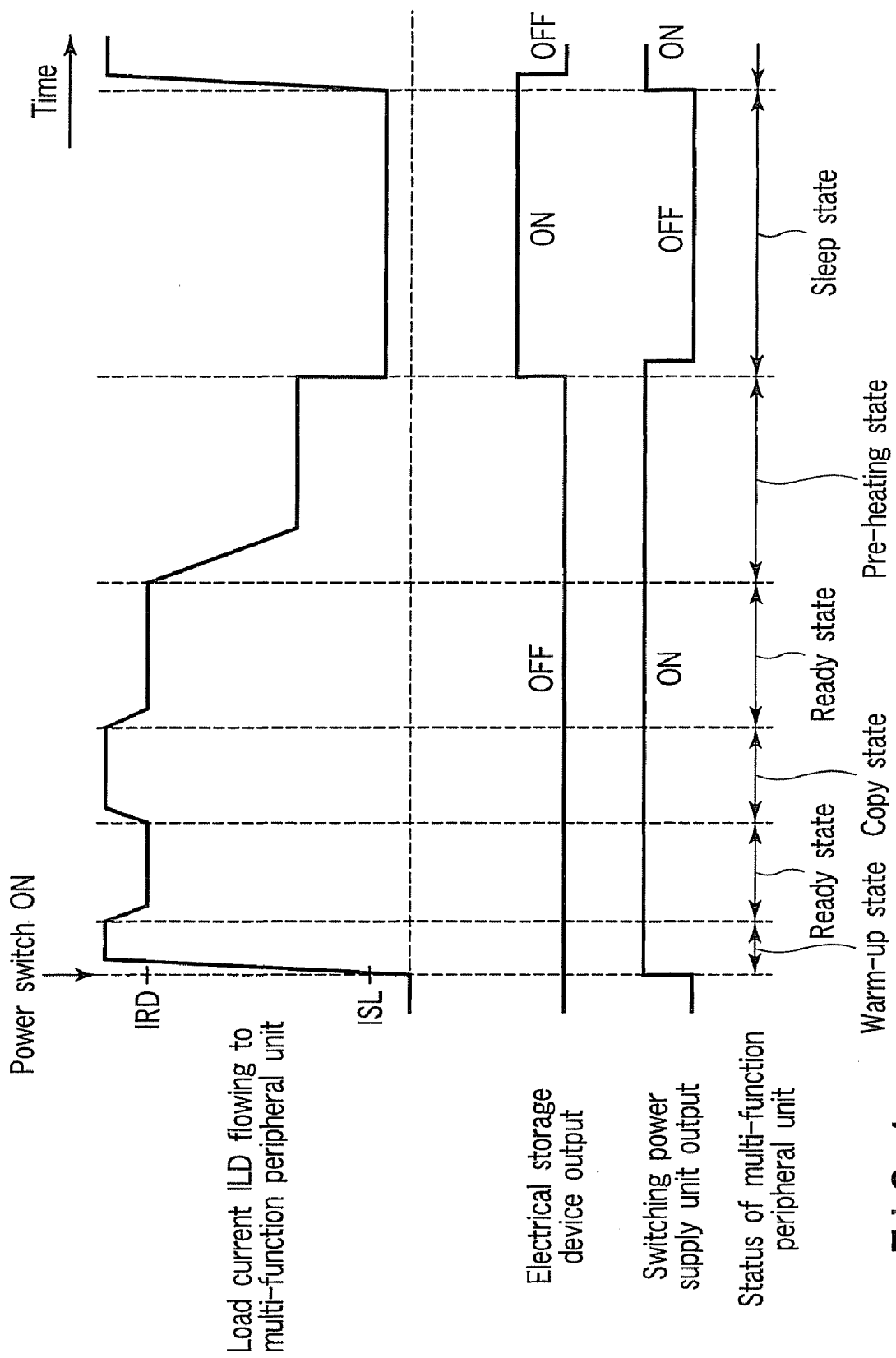
FIG. 4 is a waveform chart showing a relation between output states of a switching power supply unit and an electrical storage device obtained by the control operation shown in FIG. 2 and a load current flowing to a multi-function peripheral unit.
Figure 5:
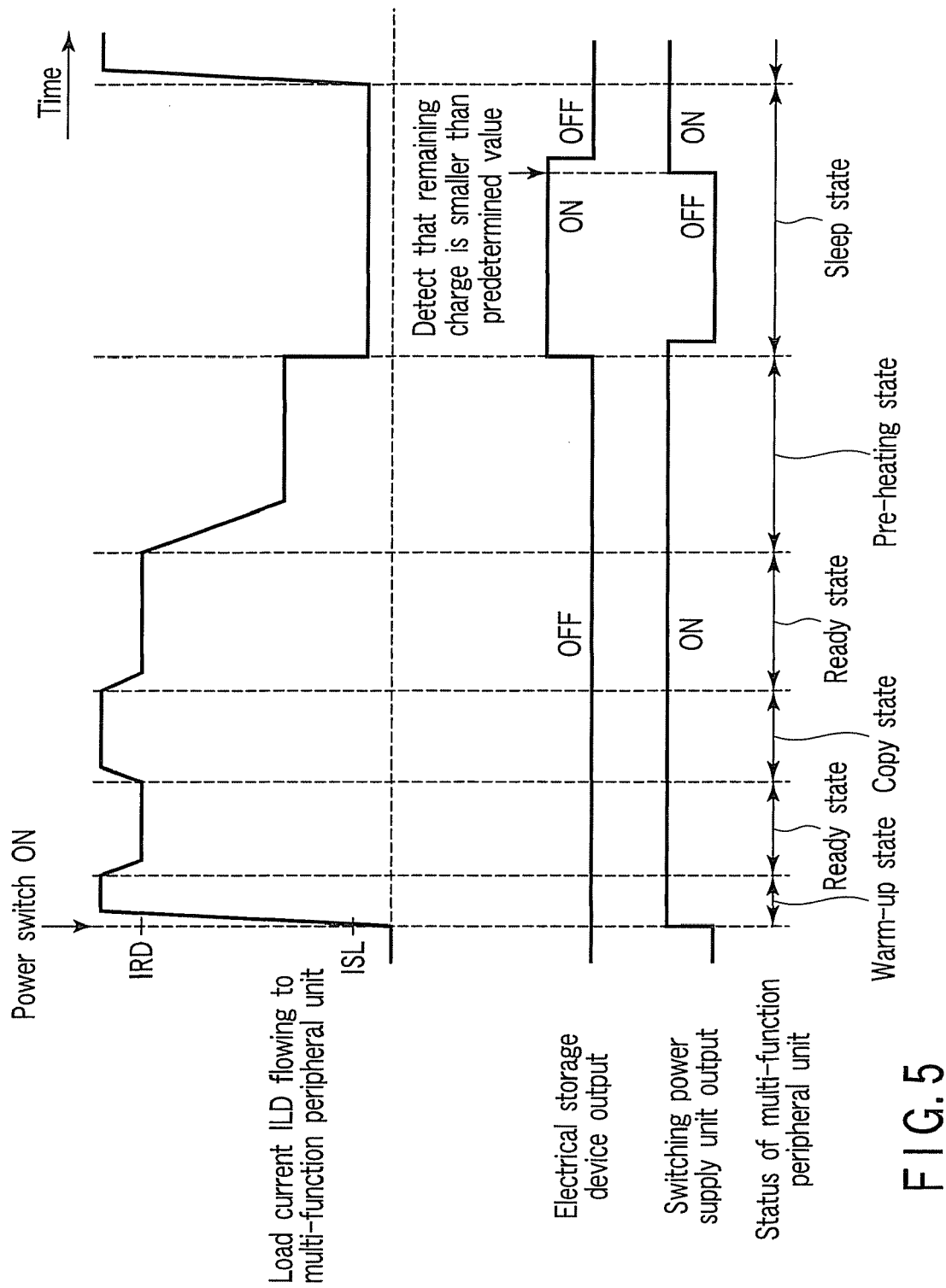
FIG. 5 is a waveform chart for explaining switching of the output states of the switching power supply unit and the electrical storage device that is performed when it is detected that remaining charge of the electrical storage device shown in FIG. 1 is smaller than a predetermined value.

FIG. 4 shows a relation between output states of the switching power supply unit 21 and the electrical storage device 22 obtained by the control operation shown in FIG. 2 and the load current ILD flowing to the multi-function peripheral unit 10. After the power supply is turned on, a state of the multi-function peripheral unit 10 transitions in order of the warm-up state, the ready state, the copy state, the ready state, and the pre-heating state as shown in FIG. 3. Since the load current ILD is equal to or larger than the threshold ISL during this transition, the electric power from the switching power supply unit 21 is supplied to the multi-function peripheral unit 10. When the multi-function peripheral unit 10 transitions from the pre-heating state to the sleep state, the load current ILD decreases to be smaller than the threshold ISL. When the electrical storage device 22 is in the full charge state or a state close to the full charge state, the power supply control circuit 30 switches the electric power from the switching power supply unit 21 to the electric power from the electrical storage device 22 according to this decrease in the load current ILD and supplies the electric power to the multi-function peripheral unit 10. When the multi-function peripheral unit 10 transitions from the sleep state to the warm-up state, the load current ILD increases to be equal to or larger than the threshold ISL. The power supply control circuit 30 switches the electric power from the electrical storage device 22 to the electric power from the switching power supply unit 21 according to this increase in the load current ILD and supplies the electric power to the multi-function peripheral unit 10. In this connection, when the remaining charge of the electrical storage device 22 decreases to be smaller than the predetermined value in the sleep state, the power supply control circuit 30 also switches the electric power from the electrical storage device 22 to the electric power from the switching power supply unit 21 as shown in FIG. 5 and supplies the electric power to the multi-function peripheral unit 10.

In the digital multi-function peripheral according to this embodiment, the load current ILD flowing to the multi-function peripheral unit 10 is monitored by the power supply control circuit 30. When the load current ILD is smaller than the threshold ISL set as the allowable lower limit of the power efficiency of the switching power supply unit 21, the electric power from the electrical storage device 22 is supplied to the multi-function peripheral unit 10 instead of the electric power from the switching power supply unit 21. When the load current ILD increases to be equal to or larger than the threshold ISL, the electric power from the switching power supply unit 21 is supplied to the multi-function peripheral unit 10. In other words, since the switching power supply unit 21 is used in a state in which the power efficiency is in the allowable range, it is possible to prevent wasteful power consumption due to the fall in the power efficiency.

Since the electrical storage device 22 is used for the supply of electric power in a state in which the load current ILD decreases, even if an electrical storage capacity is relatively small, it is possible to continue the supply of electric power over a long time. This is advantageous in reducing a size of the digital multi-function peripheral. On the other hand, when the load current ILD increases exceeding a fixed value such as the threshold ISL, the use of the electrical storage device 22 is stopped. Consequently, since an excessively large electric current does not flow out from the electrical storage device 22, it is possible to extend the durable life of the electrical storage device 22.

Moreover, since a state of the multi-function peripheral unit 10 is grasped by the power supply control circuit 30 through the monitoring of the load current ILD, it is possible to secure universality with respect to a change of a type of the multi-function peripheral unit 10. In other words, since it is possible to adapt the control program of the control processing unit 35 to various kinds of the multi-function peripheral unit 10 simply by changing the threshold ISL and the like in the control program, it is unnecessary to design the power supply control circuit 30 again.

Figure 7:
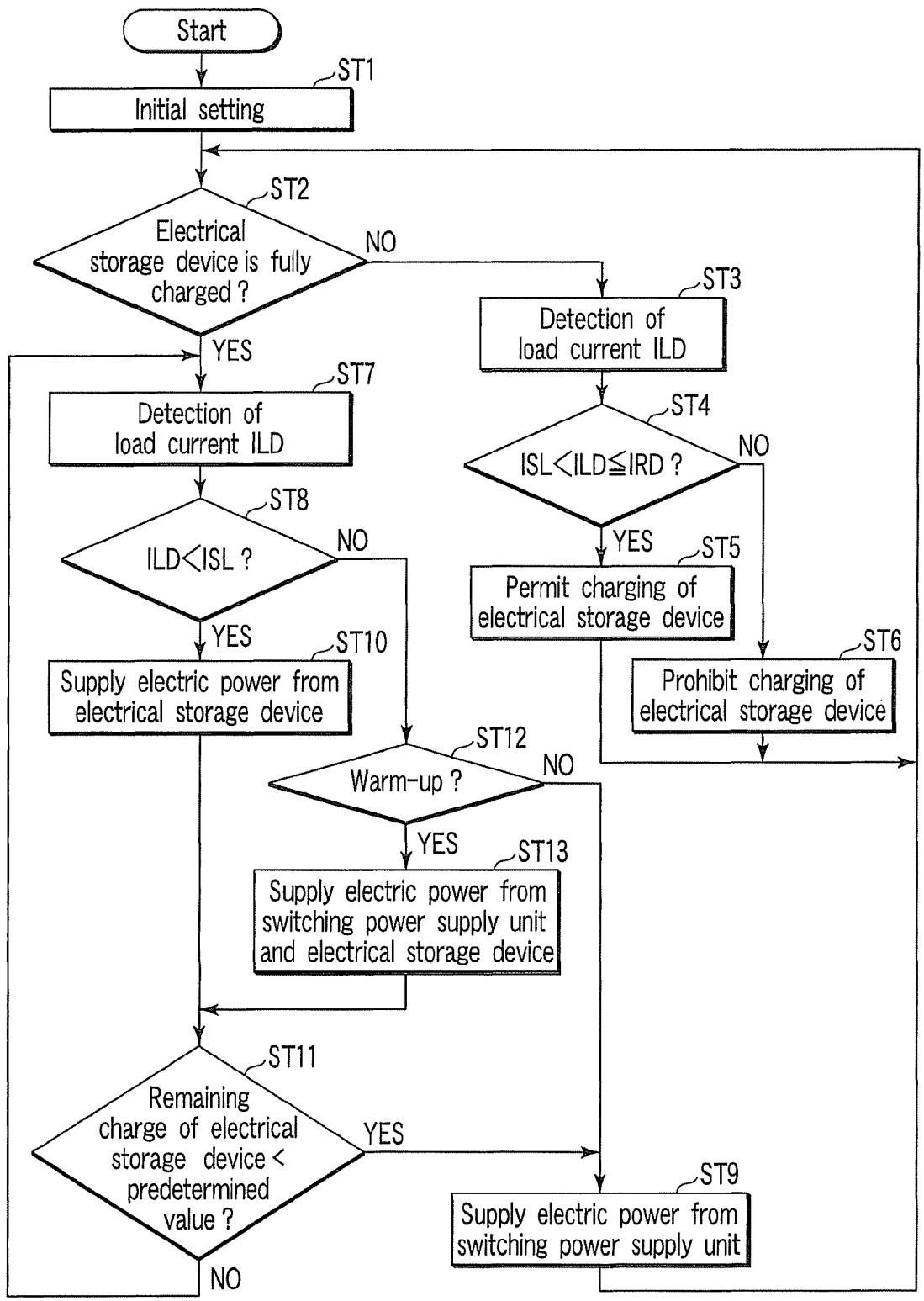
FIG. 7 is a flowchart showing a control operation performed in a power supply control circuit shown in FIG. 6.

A digital multi-function peripheral according to a second embodiment of the present invention will be hereinafter explained. The digital multi-function peripheral is applied when an electrical storage capacity of the electrical storage device 22 shown in FIG. 6 is relatively large. FIG. 6 schematically shows a circuit configuration of the digital multi-function peripheral according to the second embodiment. FIG. 7 shows a control operation performed in the power supply control circuit 30 shown in FIG. 6. This digital multi-function peripheral is applied when the electrical storage capacity of the electrical storage device 22 is relatively large. The structure of the digital multi-function peripheral is the same as the structure in the first embodiment except the structure for reducing a warm-up time. In FIGS. 6 and 7, components same as those in the first embodiment are denoted by the identical reference numerals and signs and detailed explanation of the components is omitted.

In this digital multi-function peripheral, as shown in FIG. 6, the printer unit 12 includes a fixing heater 12B that supports the fixing heater 12A and the power supply circuit 20 includes a switch 27 that is connected between the fixing heater 12B and the electrical storage device 22 and controls the supply of electric power from the electrical storage device 22 to the fixing heater 12B. A control program of the control processing unit 35 is changed from that in the first embodiment to perform, at least in the warm-up state, power supply control for supplying the electric power from the electrical storage device 22 to the fixing heater 12B in addition to supplying the electric power from the switching power supply unit 21 to the multi-function peripheral unit 10 including the fixing heater 12A. Specifically, step ST12 and step ST13 shown in FIG. 7 are added. The switch 27 is turned off when a control signal CNT4 obtained from the control processing unit 35 is at the low level and is turned on when the control processing unit 35 is at the high level.

Step ST12 is provided to check whether the multi-function peripheral unit 10 is in the warm-up state. Step ST12 is executed when it is confirmed in step ST8 that the load current ILD is equal to or larger than the threshold ISL. The multi-function peripheral unit 10 comes into the warm-up state, for example, when a copy start request is inputted in the preheating state or the sleep state. As an example for confirming this warm-up state, a substantial increase in the load current ILD from a current value smaller than the reference value IRD in the ready state only has to be detected.

Figure 8:
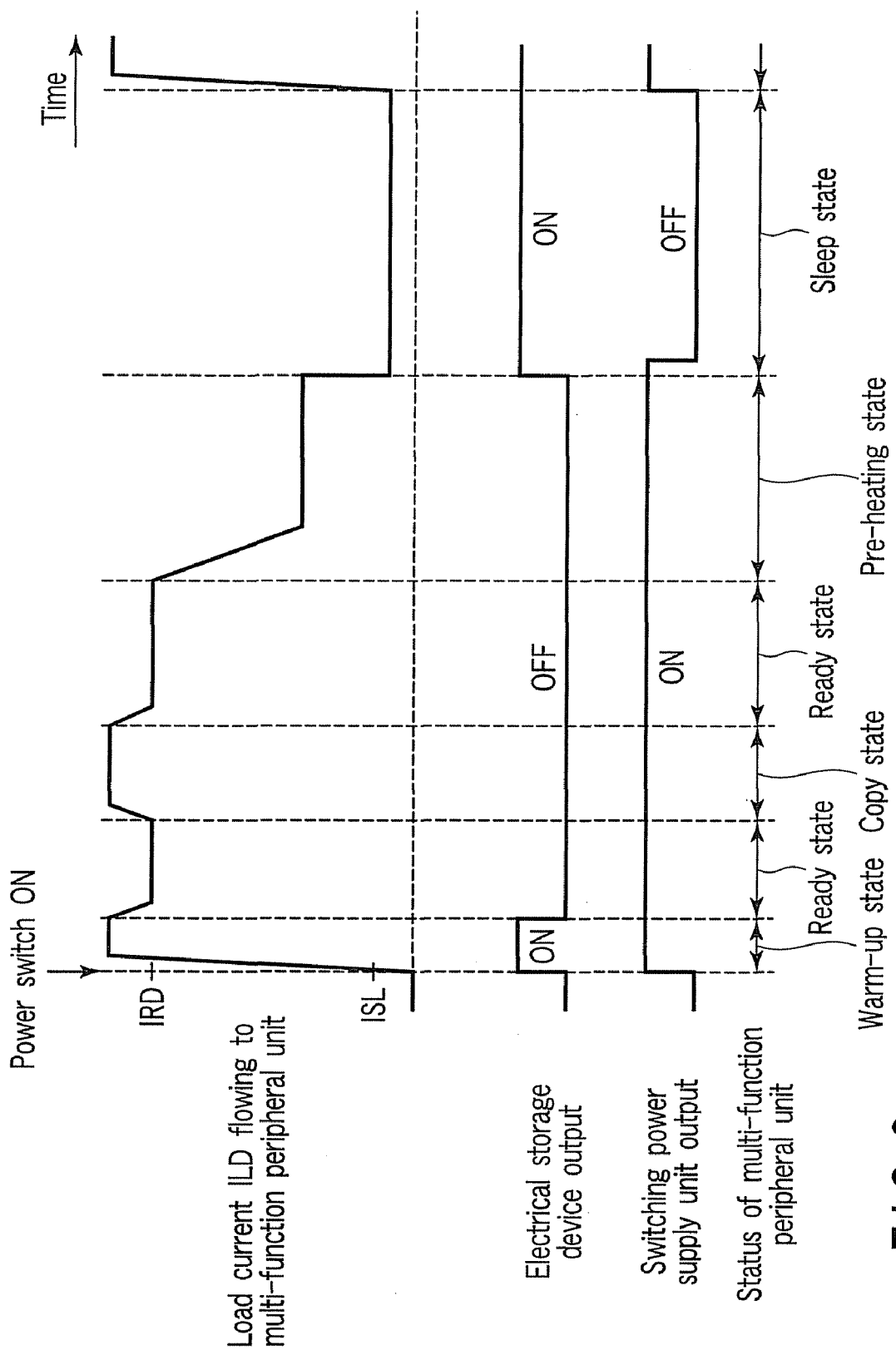
FIG. 8 is a waveform chart showing a relation between output states of a switching power supply unit and an electrical storage device obtained by the control operation shown in FIG. 7 and a load current flowing to a multi-function peripheral unit.

When the warm-up state is confirmed in step ST12, the power supply control circuit 30 executes step ST13. In step ST13, the power supply control circuit 30 sets the control signal CNT3 to the high level to supply the electric power from the switching power supply unit 21 to the multi-function peripheral unit 10 (including the fixing heater 12A) and sets the control signal CNT4 to the high level to supply the electric power from the electrical storage device 22 to the fixing heater 12B of the multi-function peripheral unit 10. Consequently, the electric power from the switching power supply unit 21 and the electric power from the electrical storage device 22 are supplied to the multi-function peripheral unit 10 together in the warm-up state as shown in FIG. 8. In this connection, the control signal CNT1 is maintained at the low level in the warm-up state. The switch 25 is controlled not to supply the electric power from the electrical storage device 22 to the components other than the fixing heater 12B. After the execution of step ST13, it is checked in step ST11 whether the remaining charge of the electrical storage device 22 decreases to be smaller than a predetermined value set to, for example, 10%. When the remaining charge is not smaller than this predetermined value, step ST7 is executed again. When the warm-up state does not end, steps ST7, ST8, ST12, ST13, and ST11 are repeated and the electric power from the switching power supply unit 21 and the electric power from the electrical storage device 22 are continuously supplied to the multi-function peripheral unit 10. When it is confirmed in step ST12 that the multi-function peripheral unit 10 is not in the warm-up state or when it is confirmed in step ST11 that the remaining charge is smaller than the predetermined value in the warm-up state, setting for supplying the electric power from the switching power supply unit 21 to the multi-function peripheral unit 10 is performed in step ST9. Consequently, only the electric power from the switching power supply unit 21 is supplied to the multi-function peripheral unit 10.

Figure 9:
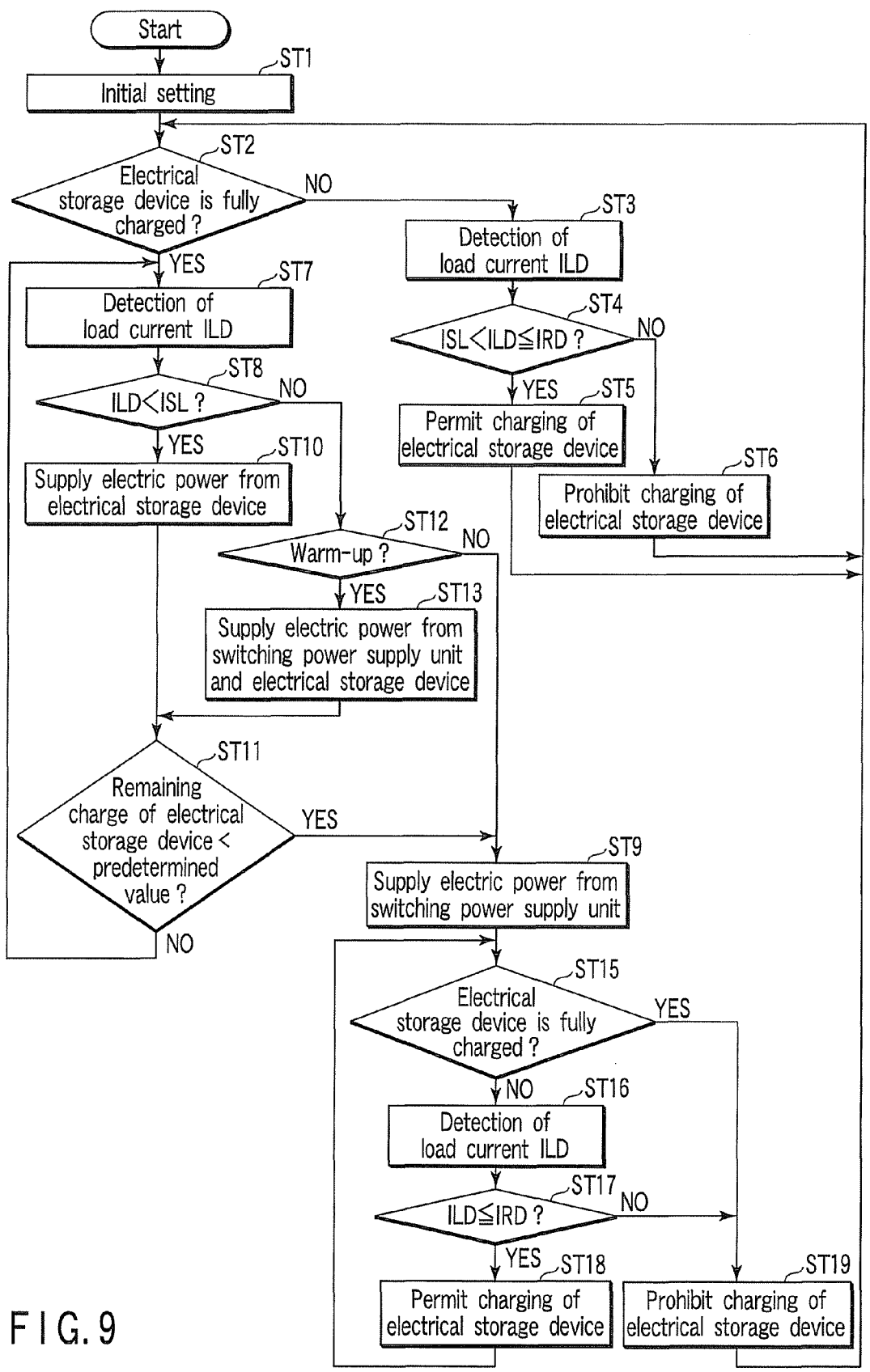
FIG. 9 is a flowchart showing a control operation performed in a modification of the power supply control circuit shown in FIG. 6.

In this case, in order to improve the power efficiency of the switching power supply unit 21, for example, the power supply control circuit 30 may be modified to perform a control operation shown in FIG. 9. In the control operation shown in FIG. 9, steps ST15 to ST19 shown in FIG. 3 are added to the control operation shown in FIG. 7. Consequently, the load current ILD of the switching power supply unit 21 increases and the power efficiency is improved. In other words, it is possible to prevent continuation of a state in which the power efficiency is low.

In the second embodiment, the electrical storage device 22 effectively functions as an auxiliary power supply that feeds an electric current to the fixing heater 12B in warming up the fixing device. It is possible to reduce a warm-up time required for raising the temperature of the fixing device to a predetermined fixing temperature through cooperation of the fixing heaters 12A and 12B and improve convenience. Here, it is important that the electrical storage device 22, which supplies electric power to the multi-function peripheral unit 10 instead of the switching power supply unit 21 in the sleep state, can be used together with the switching power supply unit 21 in the warm-up state in order to supply electric power to the multi-function peripheral unit 10 and the load current ILD is used to confirm the warm-up state.

Here, an actual change in power consumption in the digital multi-function peripheral according to this embodiment is explained.

When the multi-function peripheral unit 10 is in the warm-up state or the copy state, the fixing heater 12A consumes electric power of about 900 W. When the multi-function peripheral unit 10 comes into the ready state, the fixing heater 12A is intermittently energized. Average power consumption decreases to be smaller than 900 W but is still considerably large. When the ready state continues over a first predetermined time, the multi-function peripheral unit 10 comes into the pre-heating state and the energization of the fixing heater 12A is stopped. In a relatively high-speed digital multi-function peripheral, output power of the switching power supply unit 21 is about 300 to 500 W in this state. A total amount of current consumption in the multi-function peripheral unit 10, which is a component on a secondary side of the switching power supply unit 21, also reaches 200 W to 400 W. The power efficiency of the switching power supply unit 21 at this point is about 80% of a maximum value. If a total amount of current consumption in the multi-function peripheral unit 10 is 200 W, power consumption from the viewpoint of the switching power supply unit 21 is 250 W. Moreover, when the pre-heating state continues over a second predetermined time, the multi-function peripheral unit 10 comes into the sleep state. In this state, the energization of the fixing heater 12A is stopped and, moreover, operations of respective boards and sensors provided in the main control unit 14, the printer unit 12, and the scanner unit 11 in the multi-function peripheral unit 10 as the components on the secondary side are also limited. Consequently, power consumption on the secondary side is controlled to be about 20 W.

If it is assumed that the power efficiency of the switching power supply unit 21 is also about 80% of the maximum value in this sleep state, power consumption from the viewpoint of this switching power supply unit 21 is equal to or smaller than 30 W. This value can satisfy the rule for power consumption in the sleep state. However, actually, the power efficiency of the switching power supply unit 21 falls to be smaller than 50% of the maximum value. Therefore, it is difficult to satisfy the rule.

In this embodiment, the switching power supply unit 21 is stopped in this sleep state and the electric power from the electrical storage device 22 is used. Therefore, it is possible to prevent electric power from being wastefully consumed by the switching power supply unit 21 in a situation in which the power efficiency is deteriorated. This holds true in the first embodiment in which the control operation shown in FIG. 2 is performed.

In this embodiment, the electric power from the electrical storage device 22 is supplied to the multi-function peripheral unit 10 together with the electric power from the switching power supply unit 21 in the warm-up state. However, in the copy state, the electric power from the electrical storage device 22 may also be supplied to the multi-function peripheral unit 10 together with the electric power from the switching power supply unit 21 on the basis of a result of monitoring of the load current ILD. Note that, it is preferable that the electric power from the electrical storage device 22 is supplied to only the fixing heater 12B of the multi-function peripheral unit 10.

In the power supply control circuit 30, mainly the control processing unit 35 performs a complicated operation in accordance with the control program. However, since the control processing unit 35 is constituted by a programmable microprocessor chip and the like, manufacturing cost can be held down more than that in the case in which the power supply circuit 20 performs a complicated operation. In other words, in the power supply circuit 20, since respective components need sufficiently large withstanding voltages, unit prices of the components are extremely high. On the other hand, the program microprocessor chip and the like may be general-purpose mass-produced products and do not need large withstanding voltages unlike the components provided in the power supply circuit 20. The buffer circuits 32 and 33 and the differential amplifier 34 are provided in the power supply control circuit 30 in order to detect a voltage drop due to the load current ILD. However, since the buffer circuits 32 and 33 and the differential amplifier 34 are extremely general circuits, prices of these circuits are negligible.

Moreover, in the embodiment described above, it is confirmed in advance that the electrical storage device 22 is fully charged and the electric power from the switching power supply unit 21 and the electric power from the electrical storage device 22 are switched. This switching may be performed, for example, on condition that the remaining charge exceeds a fixed value even if the electrical storage device 22 is not fully charged. In this case, the supply of electric power from the switching power supply unit 21 is continued in order to charge the electrical storage device 22 and stopped after this charging. In this connection, a charging current of the electrical storage device 22 prevents the fall in the power efficiency of the switching power supply unit 21.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A multi-function peripheral comprising:
a multi-function peripheral unit configured to have plural functions including a copy function;
a power supply unit configured to be connected to a commercial power supply as a main power supply for the multi-function peripheral unit;

an electrical storage device charged in advance as an auxiliary power supply for the multi-function peripheral unit; and a control circuit that monitors a load current flowing to the multi-function peripheral unit, supplies electric power from the electrical storage device to the multi-function peripheral unit instead of electric power from the power supply unit when the load current is smaller than a threshold set as an allowable lower limit of power efficiency of the power supply unit, and supplies the electric power from the power supply unit to the multi-function peripheral unit when the load current increases to be equal to or larger than the threshold, the control circuit controlling the electric storage device to be charged in a copy state when the load current is equal to or larger than the threshold and is smaller than a maximum value of the load current flowing to the multi-function peripheral unit.

2. A multi-function peripheral according to claim 1, wherein the control circuit confirms that remaining charge of the electrical storage device decreases to be smaller than a predetermined value while the electric power from the electrical storage device is supplied to the multi-function peripheral unit instead of the electric power from the power supply unit and switches the electric power from the electrical storage device to the electric power from the power supply unit.

3. A multi-function peripheral according to claim 1, wherein the control circuit confirms in advance, in order to switch the electric power from the power supply unit to the electric power from the electrical storage device, that the electrical storage device is charged.

4. A multi-function peripheral according to claim 3, wherein the control circuit supplies the electric power from the power supply unit to the multi-function peripheral unit irrespective of the load current when the electrical storage device is not charged.

5. A multi-function peripheral according to claim 4, wherein the control circuit charges the electrical storage device with the electric power from the power supply unit when the electrical storage device is not charged.

6. A multi-function peripheral according to claim 1, wherein the control circuit supplies the electric power from both the power supply unit and the electrical storage device to the multi-function peripheral unit when the load current is equal to or larger than the threshold and when the multi-function peripheral is in a warm-up state.

7. A power supply apparatus comprising:
a power supply unit configured to be connected to a commercial power supply as a main power supply for a multi-function peripheral unit that has plural functions including a copy function;
an electrical storage device charged in advance as an auxiliary power supply for the multi-function peripheral unit; and
a control circuit that monitors a load current flowing to the multi-function peripheral unit, supplies electric power from the electrical storage device to the multi-function peripheral unit instead of electric power from the power supply unit when the load current is smaller than a threshold set as an allowable lower limit of power efficiency of the power supply unit, and supplies the electric power from the power supply unit to the multi-function peripheral unit when the load current increases to be equal to or larger than the threshold the control circuit controlling the electric storage device to be charged in a copy state when the load current is equal to or larger than the threshold and is smaller than a maximum value of the load current flowing to the multi-function peripheral unit.

8. A power supply apparatus according to claim 7, wherein the control circuit confirms that remaining charge of the electrical storage device decreases to be smaller than a predetermined value while the electric power from the electrical storage device is supplied to the multi-function peripheral unit instead of the electric power from the power supply unit and switches the electric power from the electrical storage device to the electric power from the power supply unit.

9. A power supply apparatus according to claim 7, wherein the control circuit confirms in advance, in order to switch the electric power from the power supply unit to the electric power from the electrical storage device, that the electrical storage device is charged.

10. A power supply apparatus according to claim 9, wherein the control circuit supplies the electric power from the power supply unit to the multi-function peripheral unit irrespective of the load current when the electrical storage device is not charged.

11. A power supply apparatus according to claim 10, wherein the control circuit charges the electrical storage device with the electric power from the power supply unit when the electrical storage device is not charged.

12. A power supply apparatus according to claim 7, wherein the control circuit supplies the electric power from both of the power supply unit and the electrical storage device to the multi-function peripheral unit when the load current is equal to or larger than the threshold and when the multi-function peripheral is in a warm-up state.

13. A power supply control method for a power supply apparatus including a power supply unit connected to a commercial power supply as a main power supply for a multi-function peripheral unit that has plural functions including a copy function and an electrical storage device charged in advance as an auxiliary power supply for the multi-function peripheral unit, the power supply control method comprising:
monitoring a load current flowing to the multi-function peripheral unit;
supplying electric power from the electrical storage device to the multi-function peripheral unit instead of electric power from the power supply unit when the load current is smaller than a threshold set as an allowable lower limit of power efficiency of the power supply unit;
supplying the electric power from the power supply unit to the multi-function peripheral unit when the load current increases to be equal to or larger than the threshold; and
controlling the electric storage device to be charged in a copy state when the load current is equal to or larger than the threshold and is smaller than a maximum value of the load current flowing to the multi-function peripheral unit.

14. A power supply control method according to claim 13, further comprising:
confirming that remaining charge of the electrical storage device decreases to be smaller than a predetermined value while the electric power from the electrical storage device is supplied to the multi-function peripheral unit instead of the electric power from the power supply unit; and
switching the electric power from the electrical storage device to the electric power from the power supply unit.

15. A power supply control method according to claim 13, further comprising confirming in advance, in order to switch the electric power from the power supply unit to the electric power from the electrical storage device, that the electrical storage device is charged.

16. A power supply control method according to claim 15, further comprising supplying the electric power from the power supply unit to the multi-function peripheral unit irrespective of the load current when the electrical storage device is not charged.

17. A power supply control method according to claim 16, further comprising charging the electrical storage device with the electric power from the power supply unit when the electrical storage device is not charged.

18. A power supply control method according to claim 13, further comprising supplying the electric power from both of the power supply unit and the electrical storage device to the multi-function peripheral unit when the load current is equal to or larger than the threshold and when the multi-function peripheral is in a warm-up state.

* * * * *

UNITED STATES PATENT AND TRADEMARK OFFICE
CERTIFICATE OF CORRECTION

PATENT NO. : 7,966,501 B2  
APPLICATION NO. : 11/867316  
DATED : June 21, 2011  
INVENTOR(S) : Tetsuo Kitamura Page 1 of 1

It is certified that error appears in the above-identified patent and that said Letters Patent is hereby corrected as shown below:

The error occurs on the first page item (12), and item (75) Inventors:

Tetsuo Kitamrua

It should read:

(12) and (75) Inventors:

Tetsuo Kitamura

Signed and Sealed this
Nineteenth Day of June, 2012

David J. Kappos
*Director of the United States Patent and Trademark Office*